J. SHAW.
INTERNAL COMBUSTION ENGINE.
APPLICATION FILED APR. 15, 1914.
1,142,851.
Patented June 15, 1915.
3 SHEETS—SHEET 3.
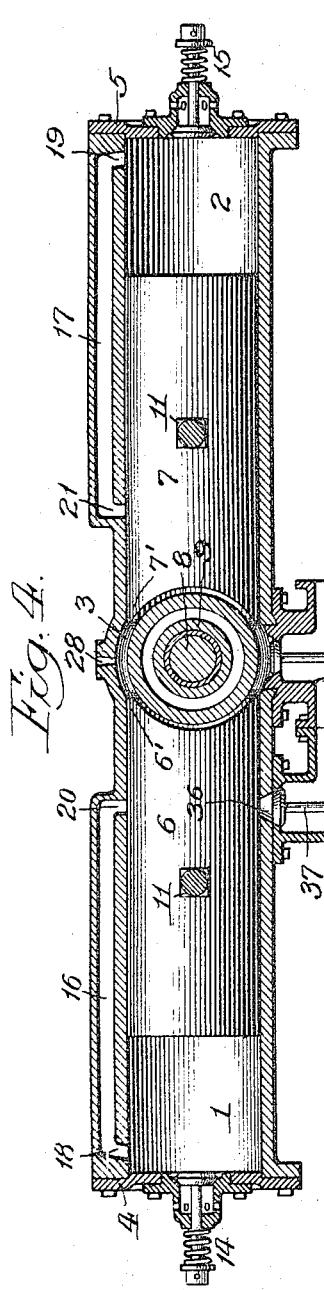
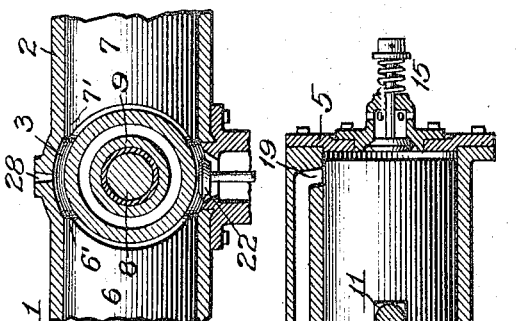
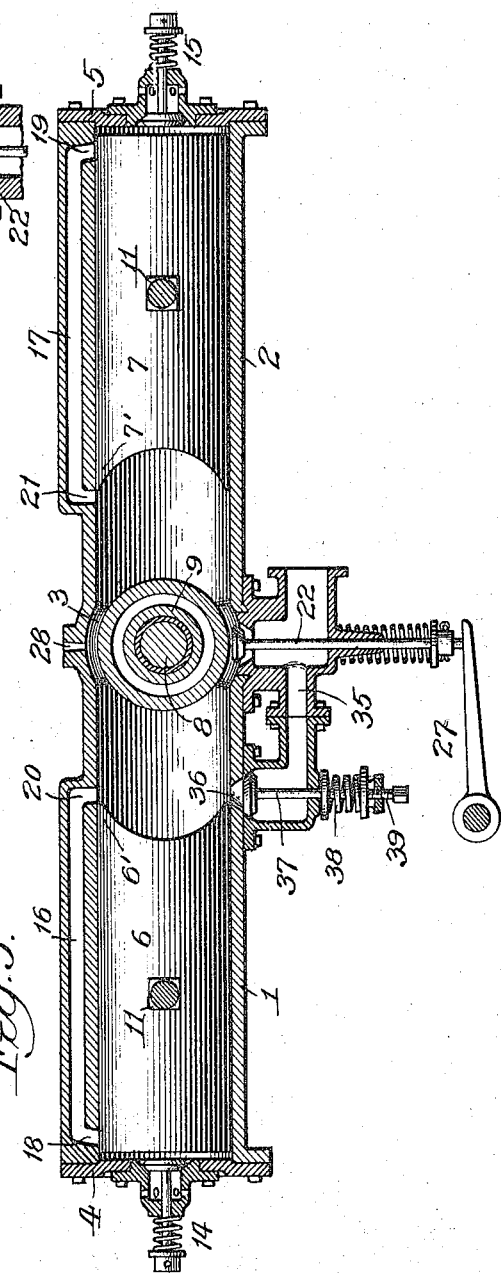
Witnesses:
John Endere
M. H. Holmes
Inventor:
James Shaw,
by
Robert Burns.
Atty.

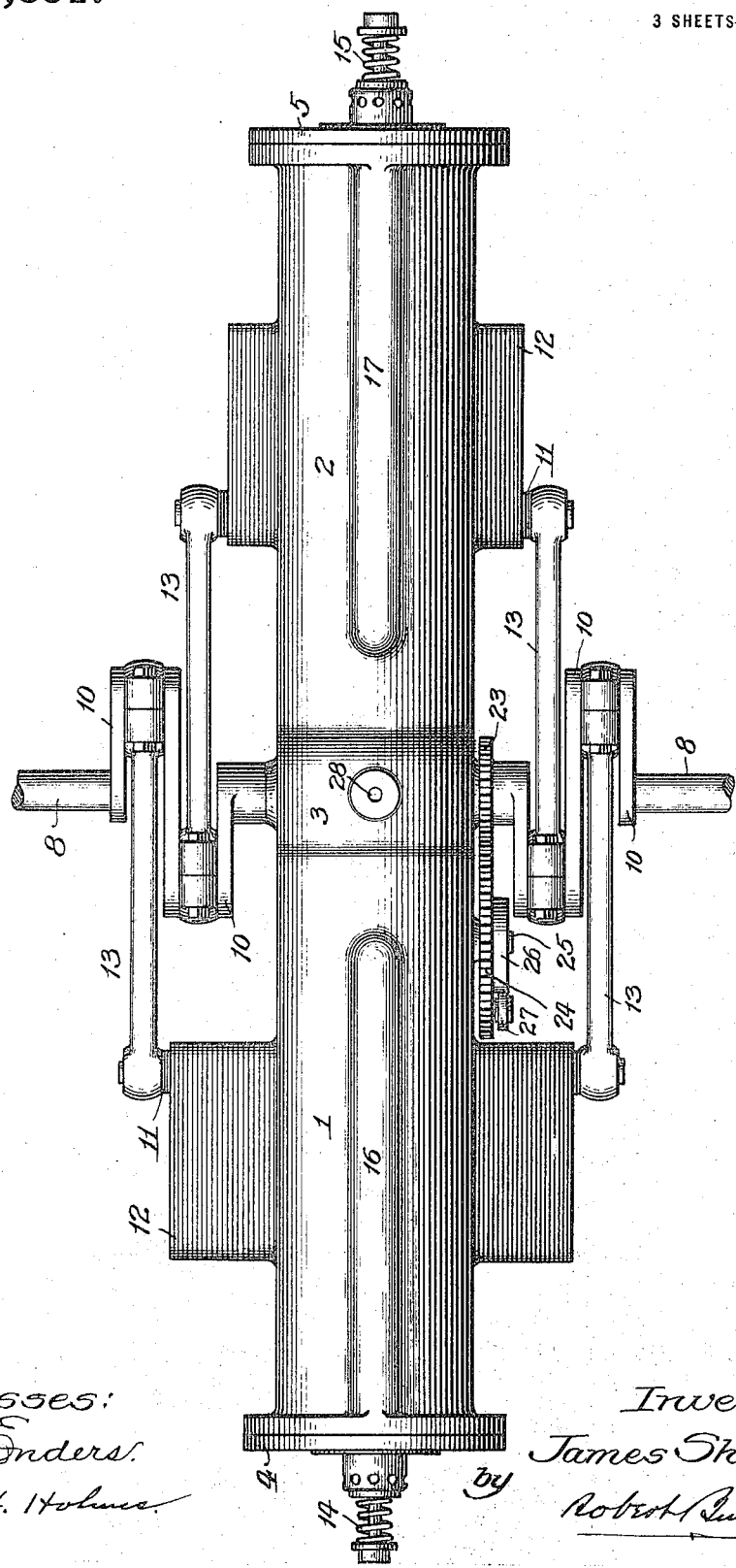

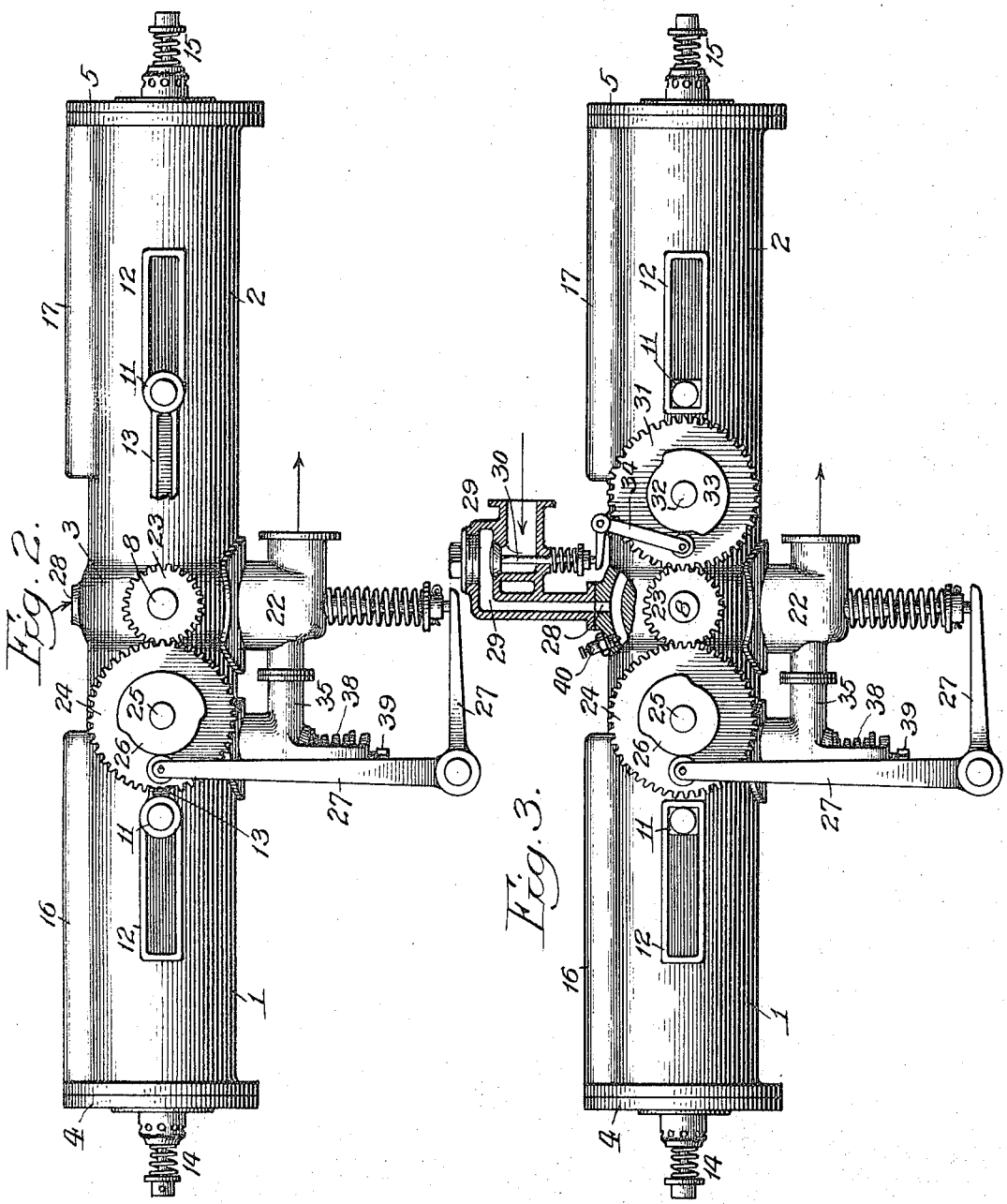

UNITED STATES PATENT OFFICE.

JAMES SHAW, OF LODI, CALIFORNIA.

INTERNAL-COMBUSTION ENGINE.

1,142,851.  Specification of Letters Patent.  Patented June 15, 1915.

Application filed April 15, 1914. Serial No. 831,891.

*To all whom it may concern:*

Be it known that I, JAMES SHAW, a citizen of the United States of America, and a resident of Lodi, in the county of San Joaquin, State of California, have invented certain new and useful Improvements in Internal-Combustion Engines, of which the following is a specification.

This invention relates to that class of four-cycle internal combustion engines in which auxiliary charges of compressed air are supplied to the combustion chamber in connection with the usual charge of gaseous fuel compressed in said combustion chamber by the engine piston. And the present improvement has for its object to provide a simple, durable and compact structural formation and combination of parts, whereby additional quantities of air are compressed and supplied in a compressed condition to the combustion chamber of the engine at the proper periods in the cycles of operation of the same, and thus provide the requisite amount of air to effect a perfect combustion of the charge of gaseous fuel in the combustion chamber and attain in turn an effective operation of the engine at high altitudes.

Another object is to provide in connection with the above type of internal combustion engines, a simple and efficient structural formation and combination of parts, whereby, when a predetermined pressure is reached in the combustion chamber previous to the compression stroke of the pistons, further increase of pressure is automatically prevented, all as will hereinafter more fully appear.

In the accompanying drawings Figure 1, is a plan view of an engine to which the present invention is applied. Fig. 2, is a side elevation of the engine, adapted for use with a forced feed fuel supply. Fig. 3, is a similar view of the engine adapted for use with a suction feed fuel supply. Fig. 4, is a longitudinal sectional elevation, illustrating the engine parts in position at the beginning of an active stroke of the engine pistons. Fig. 5, is a similar view, illustrating the engine parts in the exhaust stroke of the pistons. Fig. 6, is a detail longitudinal sectional elevation illustrating the engine parts in their third position in which a supply of air is drawn into the combustion chamber through the exhaust valve.

Similar reference numerals indicate like parts in the several views.

Referring to the drawings, 1 and 2, represent the pair of counterpart engine cylinders, connected together in longitudinal alinement, with their adjacent ends opening into a centrally disposed combustion chamber 3, common to both cylinders, and with their outer ends closed by heads 4 and 5, as shown. 6 and 7 are a pair of counterpart pistons moving in the bores of the respective cylinders 1 and 2, aforesaid. In the present type of high compression engines, the ends of said pistons 6, 7, next adjacent to the combustion chamber 3, are provided with longitudinal extensions 6' and 7', which in turn are formed with concave recesses in their faces, such recesses being complementary to the hereinafter described transverse annular wall which intersects the combustion chamber 3, and forms the housing for the bearings of the engine shaft. The pistons 6 and 7 are operatively connected to the engine shaft by means as follows: 8 is the main shaft of the engine, journaled in suitable bearings carried in a circular transverse partition or wall 9 in the combustion chamber 3, and provided with a plurality of crank arms 10, at the sides of said bearings, as shown. 11 are cross-heads connected to the respective engine pistons 6, 7, near the midlength of the same, and 12 are slideways arranged longitudinally at the sides of the engine cylinders 1 and 2, and acting as guides for the cross-heads 11, in their reciprocating movement. 13, are connecting links or pitmans, operatively connecting the aforesaid cross-heads 11 to the crank pins of the crank arm 10, aforesaid.

The general construction and arrangement of the engine parts, above described, is substantially the same as that set forth in my application for Letters Patent, Serial No. 828,318, filed March 30, 1914. In the present improvement the outer portions of the respective engine cylinders 1 and 2 constitute compression chambers in which supplies of air are compressed and delivered to the central combustion chamber 3 of the engine, at proper periods in each cycle of operations of the engine, and to such end the following structural arrangement of parts is employed. 14 and 15 are check valves, controlling inlet passages formed in the aforesaid heads 4 and 5, of the engine cylinders 1 and 2. 16 and 17 are counterpart longitudinally extending passages, preferably formed in the walls of the respective cylinders 1 and 2, and individual to said cylinders. The outer ends of said passages 16, 17, communicate by ports 18, 19 with the respective piston chambers near the outer ends of the same, and preferably a short distance removed from the respective cylinder heads 4 and 5, so that the engine pistons in their outward movement, and when near the end of the same, will cover said ports 18, 19, and create cushion chambers in which bodies of compressed air are confined as impact cushions for the pistons in their outward movement, and as elastic means for assisting said pistons in the initial inward movement. The inner ends of the aforesaid passages 16 and 17 communicate by ports 20 and 21, with the respective piston chambers at points at which said ports will be uncovered by the pistons, when the same are near the end of their outward movement. 22, is an exhaust valve, the chamber of which communicates with the combustion chamber 3, and with the outer atmosphere, communication being controlled by said valve 22. The valve 22 may be of any usual and suitable type, preferably of the spring closing poppet type, shown in the drawings, and operatively connected through suitable intermediate mechanism with the main shaft 8 of the engine. In the construction shown in the drawings, said mechanism comprises the following: 23 is a pinion on the shaft 8, meshing with and driving a gear wheel 24, on a countershaft 25. 26 is a cam disk mounted on the countershaft 25, and rotating in unison with the gear wheel 24, aforesaid. Said cam disk 26, is operatively connected by an intermediate lever 27, with the stem of the exhaust valve 22, to effect an opening and closing of said valve at predetermined periods in a cycle of operations of the engine, as set forth in detail in the hereinafter stated operation of the engine. 28 is the fuel inlet orifice to the combustion chamber 3, and which is connected in any usual manner to a source of gaseous fuel supply. In the construction shown in Figs. 1, 2, 4, 5 and 6, said orifice 28 is connected to any usual form of apparatus by which the fuel supply is positively forced into the combustion chamber 3, at the proper and predetermined period in the cycle of operations of the engine. While in the construction illustrated in Fig. 3, said fuel inlet orifice 28, is connected to an ordinary carbureter by a tubular connection 29, which is provided with an automatically controlled inlet valve 30, of any usual form, preferably of the ordinary spring closing poppet valve type, shown in Fig. 3, and operatively connected to the main shaft 8, through intermediate mechanism, as follows:—31, is a gear wheel meshing with and driven by the above described pinion 23 on the main shaft 8. 32 is a countershaft carrying the gear wheel 31, and a cam disk 33, that rotates in unison with said gear wheel, and is operatively connected by an intermediate lever 34, with the stem of the aforesaid fuel inlet valve 30, to effect an opening and closing of said valve at predetermined periods in a cycle of operations of the engine, as fully set forth in the operation of the engine. 35, is a passage connected at one end with the outlet portion of the chamber of the exhaust valve 22, above described, and at its other end by a port 36, with one of the piston chambers of the engine, at a point at which said port will be uncovered when the piston of said piston chamber reaches its outward position. 37 is an outwardly opening valve arranged in the aforesaid passage 35, and having a stem extending outside the wall of said passage, as shown. 38 is a spring associated with the stem of the valve 37, and tending to hold the same in its closed condition. 39 is a nut or like adjusting means engaging the lower end of the spring 38, and adapted to regulate the tension of the same, so that when a predetermined pressure is exceeded in the combustion chamber, and with the port 36 aforesaid, uncovered by the piston 6, the said valve will leave its seat to permit a release of an excess of pressure, due to increased density of the atmosphere in which the engine is operating.

The construction illustrated in Figs. 1, 2, 4, 5 and 6 of the drawings, involves an internal combustion engine of the four cycle type, in which the fuel supply is forcibly fed into the combustion chamber of the engine, and the operation is as follows: Assuming the pistons 6 and 7, to be moving outwardly from their position illustrated in Fig. 4, the bodies of air in the outer portions of the piston chambers of the cylinders 1 and 2, are gradually compressed therein, and into the longitudinal passages 16 and 17, as the pistons 6, 7, near the end of their outward movement, the exhaust valve 22, is opened by its operative connections with the main shaft 8 of the engine, to permit of the escape of the burnt gases from the combustion chamber 3, and immediately following such opening of the exhaust valve 22, the ports 18 and 19 of the passages 16 and 17, are uncovered by the engine pistons to permit the compressed air in the outer portions of the piston chambers, to flow into the combustion chamber 3, and exert a cooling action on the walls of the same, as well as aid in expelling therefrom any remaining burnt gases through the exhaust pasage and valve aforesaid. An inward movement of the pistons 6 and 7 next follows, with the exhaust valve 22, still held open, and in their initial inward movement the pistons cover the ports 20 and 21. The further inward movement of the pistons forces the greater part of the air contained in the combustion chamber 3, out through the passage of the exhaust valve 22, and simultaneously therewith draws in fresh supplies of air into the outer portions of the piston chambers through the air inlet valves 14 and 15. An outward movement of the pistons 6 and 7, next follows, with the exhaust valve 22, still held in an open condition. With a continued outward movement of the pistons, the bodies of air in the outer portions of the piston chambers are compressed, and simultaneously therewith a supply of fresh air is drawn into the combustion chamber 3, through the open passage of the exhaust valve 22. Just previous to an uncovering of the ports 20 and 21, by the engine pistons in their described outward movement, the exhaust valve 22, is permitted to close and confine the contained air in the combustion chamber 3, and immediately following the closure of said exhaust valve 22, the aforesaid ports 20, 21, are uncovered by the pistons, to permit the compressed air in the outer portions of the piston chambers to flow into the combustion chamber and mingle with the air already confined therein. An inward movement of the pistons 6 and 7 next follows, with the exhaust valve 22 in its closed condition, and in their initial inward movement the engine pistons cover the ports 20, 21. The further inward movement of the piston draws in supplies of air into the outer portions of the piston chambers, and simultaneously therewith effects a high compression of the air contained in the combustion chamber 3. As the pistons reach the end of their inward movement, a charge of aerated fuel is injected into the combustion chamber 3, and commences a fresh cycle of the operations just described.

With the construction of engine illustrated in Fig. 3, in which a fuel supply carbureted air is drawn into the combustion chamber at the proper period in the cycle of operations of the engine, the operation will vary from that above described in the following particulars: The first and second movement of the pistons will be the same as that heretofore described in connection with the construction illustrated in Figs. 1 to 6, inclusive, while the third and fourth movements of said pistons will vary from that of such former construction, as follows: An outward movement of the pistons 6 and 7, next follows, with a closure of the exhaust valve 22, at the beginning of such outward movement of the engine pistons, and simultaneously therewith an opening of the fuel inlet valve 30, is effected. With a continued outward movement of the pistons the bodies of air in the outer portions of the piston chambers are compressed, and simultaneously therewith a supply of gaseous fuel is drawn into the combustion chamber 3, through the fuel inlet valve 30. Just previous to the uncovering of the ports 20 and 21, by the pistons in their described outward movement, the fuel inlet valve 30, is permitted to close and confine the gaseous fuel supply within the combustion chamber, and immediately following the closing of said fuel inlet valve, the aforesaid ports 20 and 21, are uncovered by the pistons, to permit the compressed air in the outer portions of the piston chambers to flow into the combustion chamber and mingle with the gaseous fuel supply therein. An inward movement of the pistons 6 and 7 next follows, with the exhaust valve 22, and the fuel inlet valve 30, in their closed condition, and in their initial inward movement the pistons cover the ports 20 and 21. The further inward movement of the pistons draw in supplies of air into the outer portions of the piston chambers, and simultaneously therewith effects a high compression of the contents of the combustion chamber 3. As the pistons reach the end of their inward movement, the compressed gaseous fuel in the combustion chamber 3, is ignited by an ordinary spark plug 40, or other usual means, to commence a fresh cycle of the operations of the engine.

Having thus fully described my said invention what I claim as new and desire to secure by Letters Patent, is:—

1. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a centrally arranged crank-shaft, operative connections between said crank shaft and the pistons, an exhaust valve associated with the combustion chamber, means actuated by the crank shaft for opening and closing said exhaust valve, and means for introducing a supply of fuel into the combustion chamber, substantially as set forth.

2. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinder near the outer ends thereof, and the inner ends of said passages opening into said piston chambers at points which will be uncovered by the engine pistons when the same reach their outward position, inwardly opening check valves arranged at the outer ends of said cylinders, pistons arranged in the cylinders aforesaid, a centrally arranged crank shaft, operative connections between said crank shaft and the pistons, an exhaust valve associated with the combustion chamber, means actuated by the crank shaft for opening and closing said exhaust valve, and means for introducing a supply of fuel into the combustion chamber, substantially as set forth.

3. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a centrally arranged crank shaft, operative connections between said crank shaft and the pistons, an exhaust valve associated with the combustion chamber, means actuated by the crank shaft for opening and closing said exhaust valve, a fuel inlet valve associated with the combustion chamber, and means actuated by the crank shaft for opening and closing said valve, substantially as set forth.

4. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, inwardly opening check valves arranged at the outer ends of the cylinders, pistons arranged in the cylinders aforesaid, a centrally arranged crank shaft, operative connections between the crank shaft and the pistons, an exhaust valve associated with the combustion chamber, means actuated by the crank shaft for opening and closing said exhaust valve, a fuel inlet valve associated with the combustion chamber, and means actuated by the crank shaft for opening and closing said valve, substantially as set forth.

5. An internal combustion engine of the four cycle type comprising a central combustion chamber provided with a transverse annular wall, a pair of longitudinally alined cylinders having closed outer ends and open inner ends communicating with the combustion chamber, said cylinders having individual longitudinal passages the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a crank shaft associated with the annular wall in the combustion chamber, operative connections between said crank shaft and the pistons, an exhaust valve associated with the combustion chamber, means actuated by the crank shaft for opening and closing said exhaust valve, and means for introducing a supply of fuel into the combustion chamber, substantially as set forth.

6. An internal combustion engine of the four cycle type comprising a central combustion chamber provided with a transverse annular wall, a pair of longitudinally alined cylinders having closed outer ends and open inner ends communicating with the combustion chamber, said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a crank shaft associated with the annular wall in the combustion chamber, operative connections between said crank shaft and the pistons, the same comprising cross heads attached to the pistons intermediate their lengths, slideways therefor carried on the walls of the pair of cylinders and pitmen connecting the cross heads with the crank pins of the crank shaft, an exhaust valve associated with the combustion chamber, means actuated by the crank shaft for opening and closing said exhaust valve, and means for introducing a supply of fuel into the combustion chamber, substantially as set forth.

7. In internal combustion engine of the four cycle type comprising a central combustion chamber provided with a transverse annular wall, a pair of longitudinally alined cylinders having closed outer ends and open inner ends communicating with the combustion chamber, said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, each piston having an extension on the end next to the combustion chamber and said extension formed with a concave face, a crank shaft associated with the annular wall of the combustion chamber, operative connections between said crank shaft and the pistons, an exhaust valve associated with the combustion chamber, means actuated by the crank shaft for opening and closing said exhaust valve, and means for introducing a supply of fuel into the combustion chamber, substantially as set forth.

8. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into the said piston chambers at points which will be uncovered by the engine pistons when the same reach their outward positions, means for admitting supplies of air into the outer ends of the piston chambers, pistons arranged in the cylinders aforesaid, the inlets from the aforesaid longitudinal passages to the outer portions of the piston chambers being disposed a distance inside the outer ends of said chambers to provide closed cushioning spaces for the pistons, a centrally arranged crank shaft, operative connections between said crank shaft and the pistons, an exhaust valve associated with the combustion chamber, means actuated by the crank shaft for opening and closing said exhaust valve, and means for introducing a supply of fuel into the combustion chamber, substantially as set forth.

9. An internal combustion engine of the four cycle type comprising a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a centrally arranged crank-shaft, operative connection between said crank shaft and the pistons, an exhaust valve associated with the combustion chamber, means actuated by the crank shaft for opening and closing said exhaust valve, one piston chamber having an outlet port adapted to be uncovered by an engine piston in its outward position, a valve controlling said port and adapted to open under a predetermined pressure, and means for introducing a supply of fuel into the combustion chamber, substantially as set forth.

10. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a centrally arranged crank shaft, operative connection between said crank shaft and the pistons, an exhaust valve associated with the combustion chamber, means actuated by the crank shaft for opening and closing said exhaust valve, one piston chamber having an outlet port adapted to be uncovered by an engine piston in its outward position, a spring held valve controlling said port and adapted to open under a predetermined pressure, and means for introducing a supply of fuel into the combustion chamber, substantially as set forth.

11. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof and the inner ends of said passages opening into said piston chambers at points which will be uncovered by the engine pistons when the same reach their outward position, means for admitting supplies of air into the outer ends of the piston chambers, pistons arranged in the cylinders aforesaid, a centrally arranged crank shaft, operative connections between said crank shaft and the pistons, an exhaust valve associated with the combustion chamber, means actuated by the crank shaft for opening and closing said exhaust valve, one piston chamber having an outlet port adapted to be uncovered by an engine piston in its outward position, a valve controlling said port and adapted to open under a predetermined pressure, a housing inclosing the said valve and the exhaust valve aforesaid, and means for introducing a supply of fuel into the combustion chamber, substantially as set forth.

12. An internal combustion engine of the four cycle type comprising, a central combustion chamber, a pair of longitudinally alined cylinders having closed outer ends and open inner ends communicating with said combustion chamber, the said cylinders having individual longitudinal passages, the outer ends of the passages opening into the piston chambers of the cylinders near the outer ends thereof, and the inner ends of said passages opening into said piston chambers at points which will be uncovered by the engine pistons when the same reach their outward position, means for admitting supplies of air into the outer ends of the piston chambers, pistons arranged in the cylinders aforesaid, a centrally arranged crank shaft, operative connections between said crank shaft and the pistons, an exhaust valve associated with the combustion chamber, means actuated by the crank shaft for opening and closing said exhaust valve, one piston chamber having an outlet port adapted to be uncovered by an engine piston in its outward position, a spring held valve controlling said port and adapted to open under a predetermined pressure, a housing inclosing said valve and the exhaust valve aforesaid, and means for introducing a supply of fuel into the combustion chamber, substantially as set forth.

Signed at Chicago, Illinois, this 11th day of April, 1914.

JAMES SHAW.

Witnesses:
ROBERT BURNS,
IVA L. CRANE.